Patented Aug. 16, 1949

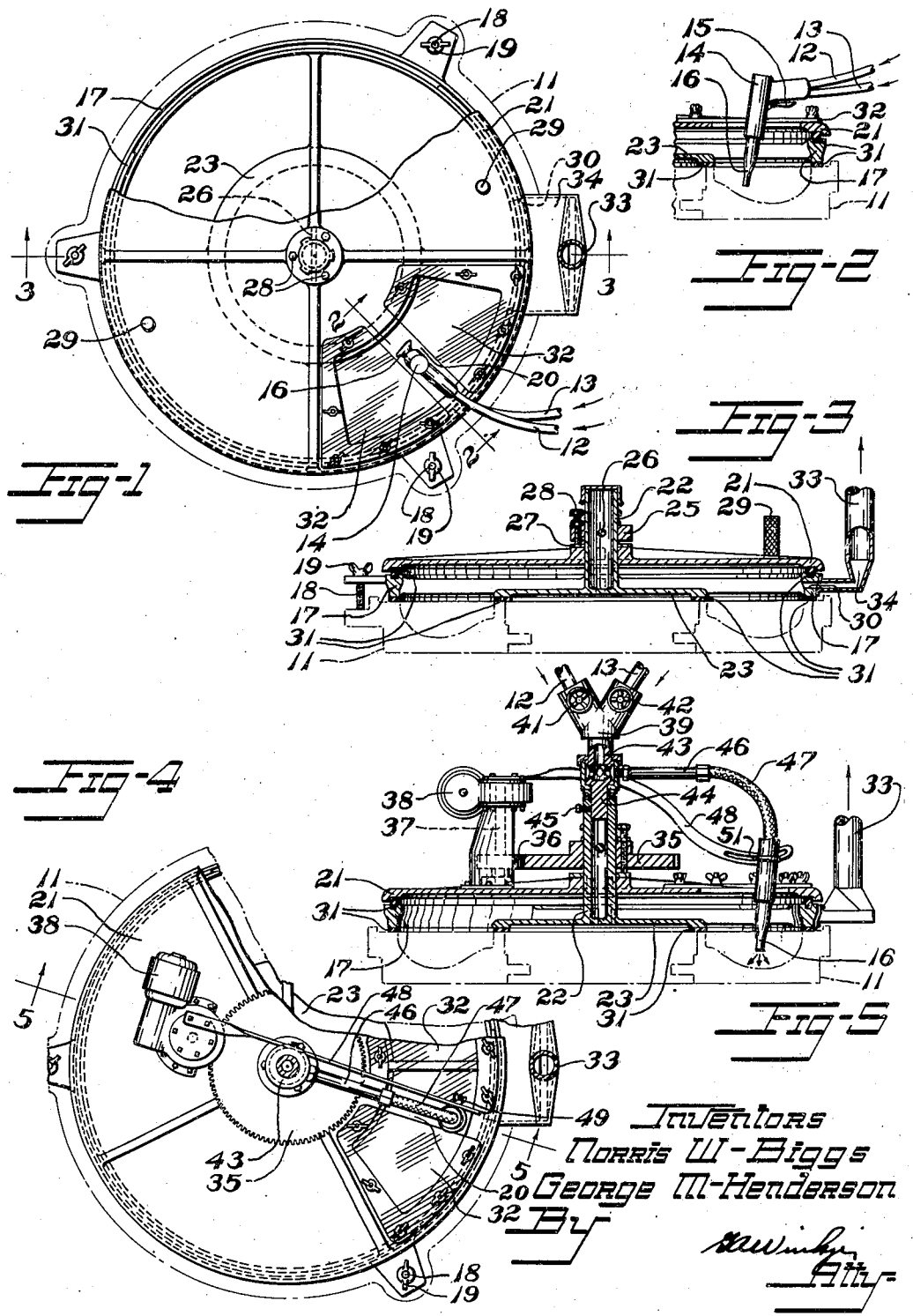

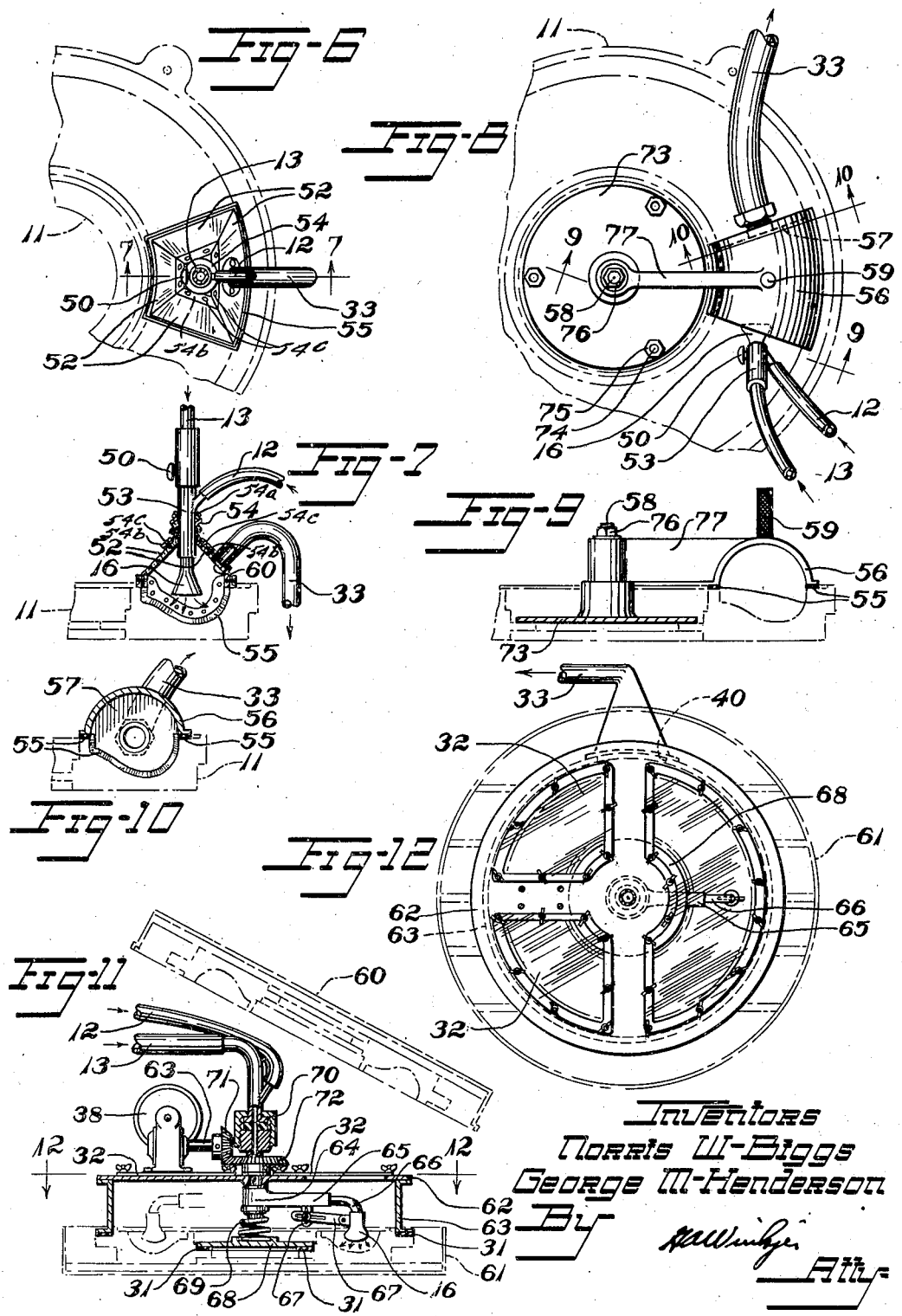

2,479,299

UNITED STATES PATENT OFFICE 2,479,299

MOLD CLEANING APPARATUS

Norris W. Biggs, Cuyahoga Falls, and George M. Henderson, Akron, Ohio, assignors to The B. F. Goodrich Company, New York, N. Y., a corporation of New York Application October 31, 1946, Serial No. 706,980

8 Claims. (Cl. 51—8.)

REISSUED
JAN 9 1951
RE 23321

This invention relates to cleaning apparatus for removing undesirable deposits from molds and especially from tire molds and inner tube molds.

In the manufacture of tires and inner tubes a mold lubricant such as soapstone is usually used to facilitate escape of air from between the tire or inner tube and the mold, and to lessen adhesion of the article to the mold surface. A portion of the lubricant sometimes adheres to the mold surface forming a deposit which increases with the number of articles molded and becomes of a size which produces blemishes in the tires and tubes if not removed.

Cleaning of the molds involves special requirements because the deposits, after being exposed to the high temperatures of molding, are baked onto the mold walls, and have tenacious properties. It is desirable that the cleaning operation be such as to be effected without requiring removal of the molds from the vulcanizers especially where the vulcanizers are of the watch-case or unit press type, so that each mold and vulcanizer will be out of service for a minimum period of time. Since many of the molds currently used are of the insert type, in which aluminum or other soft metal mold face inserts are used, it is desirable that the operator may observe the cleaning operation to avoid damaging the inserts.

Objects of the invention are to provide apparatus for cleaning a mold surface conveniently and effectively, to provide for applying a powdered abrasive to the surface to be cleaned, to provide visibility of the surface being cleaned, to provide for removing the residue of the cleaning operation, to provide for isolating the cleaning operation, to provide for lightweight and maneuverability of the mechanism, and to provide for convenience of assembly and operation.

These and further objects will be apparent from the following description, reference being had to the accompanying drawings in which:

Fig. 1 is a plan view of the apparatus constructed in accordance with and embodying the invention, parts being broken away, and a tire mold being indicated by broken lines.

Fig. 2 is a section taken along line 2—2 of Fig. 1.

Fig. 3 is a section taken along line 3—3 of Fig. 1.

Fig. 4 is a plan view of a modified construction, parts being broken away.

Fig. 5 is a section taken along line 5—5 of Fig. 4.

Fig. 6 is a plan view of a further modified construction.

Fig. 7 is a section taken along line 7—7 of Fig. 6.

Fig. 8 is a plan view of a still further modified construction.

Fig. 9 is a section taken along line 9—9 of Fig. 8.

Fig. 10 is a section taken along line 10—10 of Fig. 8.

Fig. 11 is a view in sectional elevation of a still further modification.

Fig. 12 is a section taken along line 12—12 of Fig. 11.

Apparatus constructed in accordance with and embodying the invention is shown in Figs. 1 to 3, in which the cleaning apparatus is mounted on a section of a tire mold 11 shown in broken lines. Cleaning of the mold 11 is accomplished by the action of a powdered abrasive such, for example, as sand, carbide of silicon grit, nut shells, aluminum oxide or even corn meal, which is carried by a suitable fluid such as air to the surface to be cleaned. The air is conducted to the apparatus in a conduit 12 and the abrasive in a conduit 13. The air and abrasive conduits 12 and 13 are connected to a mixing and applying member such as a gun 14. A trigger 15 may be installed in the gun 14 to actuate a valve to regulate the flow of air and abrasive, and a nozzle 16 which may be flattened and flared as desired, is mounted in the gun to cause the abrasive to leave the gun in a stream with such a configuration that cleaning action will be most effective.

A residue collecting member which comprises an annular base plate 17, is mounted on the mold section 11 by suitable fasteners such as bolts 18, and wing nuts 19. A cover plate 21 is mounted on the base plate 17 for movement of the plate relative to the base plate and has a central aperture in which a close-fitting vertical post 22 is disposed. The post may be tubular and have a supporting plate 23 integral with it, which plate is adapted to rest upon the inner periphery of the mold 11, for closing the opening that is present in the center of the mold.

A collar 25 is mounted on the post 22 and is fixed thereto as by a pin 26 which passes through the collar and post. A wearing washer 27 is mounted on the cover plate 21, and set screws 28 are threaded in collar 25 to slide on the wearing washer upon rotation of the cover plate 21 and to regulate the height of the member 22 with respect to the cover plate. Handles 29 are mounted on the cover plate 21 for manually turning the cover plate relative to the base plate 17 and relative to the post 22.

The adjoining surfaces of the mold 11, supporting plate 23, base plate 17 and cover plate 21 may be provided with gaskets 31 of rubber or other rubber-like material to make substantially air-tight seals therebetween. The cover plates 21 has a window opening which is partially covered by elements 32 of transparent material such as glass, acrylate resins such as polymethylmethacrylate, transparent rubber, transparent polyvinyl chlorides or the like materials, which may be mounted on the cover plate 21 by studs and wing nuts. A slot-like opening 20 between the transparent elements 32 is provided for the insertion of the gun 14, which conducts the abrasive and air to the mold surface. The base plate 17 has an aperture 30 connected to a conduit 33 leading to a suction-producing apparatus such as a vacuum pump or the like. The aperture 30 may be elongated and rectangular, in which case an adapter member 34 may be interposed between the conduit 33 and the aperture.

In operation, the apparatus shown in Figs. 1, 2 and 3 of the drawings is mounted on the mold 11 by wing nuts 19 threaded on studs 18 and by adjusting set screws 28 in such a manner that there is a minimum of leakage in the junction at the gaskets 31. The operator may then insert the gun 14 in the slot 20 between the transparent elements 32 and by moving the trigger 15 set up a flow of air and abrasive against the mold surface to remove undesirable incrustations and deposits therefrom. At the same time the suction producing apparatus may be started to provide a low-pressure area at the aperture 30 in the base plate 17. As the abrasive strikes the deposits and incrustations on the mold 11 it will clean the mold. The residue of abrasive and removed mold deposits is usually a dust-like substance, and will be carried by the air. Since the air pressure at the gun 14 will be greater than that at the base plate aperture 30, air and residue will flow to the base plate aperture for removal from the mold.

The mold faces which form the intricate tire tread designs currently used on tires have a large number of indentations. The deposits which form in these indentations are more difficult to remove than the deposits which form on the smooth surfaces of the mold. All the deposits may be removed by subjecting the entire mold surface to a flow of the abrasive for a sufficient period of time, however, with tire molds having inserts of soft metal such as aluminum, the time of cleaning must be limited or the inserts will be damaged and cause blemishes to appear in the molded tire. Damage may be prevented by manipulating the nozzle to provide a flow of abrasive at an angle to the mold surface which will clean each indentation in the shortest period of time. Also if the operator may observe the operation, he may limit the cleaning action at a given spot in the mold to the minimum required and thus prevent damage. Therefore it is desirable to provide a rate of removal of the abrasion such as to prevent an accumulation of particles which would obscure the vision of the operator.

The removal of the cleaning residue from the mold surface enables the operator to observe the progress of the cleaning through the transparent element 32 and thereby move the gun 14 and the cover plate 21 with the handle 29 to a portion of the mold requiring cleaning. Clean working conditions may be maintained for the operator as the mold is sealed except at the slot 20 where the gun 14 is inserted. The escape of residue or air outwardly through the slot 20 is minimized by the flow in the contrary direction as above described and the consequent induction of air through this slot.

A modified construction is shown in Figs. 4 and 5 in which features are included to provide for automatic operation. Instead of a collar, a gear 35 is mounted on the post 22. The gear 35 meshes with a gear 36 mounted on a shaft 37 which is mounted rotatably in the cover plate 21 and may be turned by a motor unit 38 mounted also on the cover plate 21.

A conduit Y member 39 has air and abrasive conducting conduits 12 and 13 connected to it. Valves 41 and 42 are installed in the Y member to provide means for regulating the flow and mixture of air and abrasive. The Y member is mounted on a swing joint member 43 which has a projection 44 slidably inserted in the tubular member 22 and may be fixed thereto by a set screw 45 threaded in the tubular member. A coduit member 46 and a flexible hose member 47 connect the swinging element of the swing joint member 43 with the nozzle 16. As in the previously described embodiment, the nozzle 16 is disposed between the transparent elements 32, 32 and directed toward the mold, but in the embodiment shown in Figs. 4 and 5 a supporting member 48 is mounted on the motor unit and the nozzle is adjustably secured thereto as by a stud and wing nut 49 disposed in a slot 51 in the supporting member.

In the operation of the embodiment of Figs. 4 and 5, the air and abrasive supply and mixture are regulated by valves 41 and 42 and the nozzle 16 may be set at the desired position and secured thereto by the wing nut 49. The motor unit 38 may be activated and cause the shaft 37 to move the gear 36 in meshing engagement with the stationary gear 35 to move the cover plate and nozzle rotatably over the mold 11. When the apparatus is properly adjusted the cleaning operation will be automatic and the necessity for manually moving the nozzle and cover plate will be eliminated. The nozzle may be moved manually, however, to direct the flow of abrasive against particularly tenacious deposits by loosening the wing nut 49.

Another modification, which incorporates a residue collecting member covering a segment of the mold, rather than the entire annulus, is shown in Figs. 6 and 7. The collecting member comprises a plurality of elements or plates 52 of the transparent material joined together and extending from the mold segment edges to an apex. An air and abrasive conducting member such as a conduit 53 is disposed in an aperture at the apex of the plate 52 and has a nozzle 16 for directing the abrasive to the mold surface. Air and abrasive supplying conduits 12 and 13 are connected to the conduit 53 and a valve 50 is included in the air conduit 13 to regulate the flow of air to the mold 11.

A bellows joint 54, which may be of flexible material such as rubber or other rubber-like material is interposed between the edges of the aperture and the conducting member 53 and mounted thereon in such a manner that the conducting member 53 and the nozzle 16 may be directed to all portions of the covered segment of the mold 11 while an air-tight seal is maintained between the conducting member and the collecting member. As shown in the drawings the bellows joint 54 has a tubular shape with circumferential corrugated folds which may be extended or contracted to provide flexibility of movement of the nozzle 16. The material of the bellows joint 54 may be clamped on the conducting member 63 by a ring member 54a and clamped on the edges of the aperture in the plate 52 by strips 54b which are secured to the plate 52 by fastening means such as pins 54c. A gasket member 55 of flexible material such as rubber or other rubber-like material is mounted on the plates 52 which abut the mold segment 11 for minimizing leakage therebetween. If desired, this gasket member may be in the form of a brush-like structure to accommodate itself better to depressions in the mold surface. An aperture 60 is provided in the plates 52 and connected to a suction-producing apparatus by a conduit 33 for removing the cleaning residue from the mold 11.

This embodiment may be operated by placing it in the mold segment, and the air and abrasive flow regulated by turning valve 50. The flow of air through conducting member 13 will create an air-pressure differential, which will draw abrasives through conduit 12 into the air stream. The nozzle 16 may then be manipulated to direct the stream of abrasive and air to the desired portion of the mold segment. The residue from the cleaning operation may be removed by actuating the suction-producing apparatus causing suction at the aperture 60. After one segment is cleaned, the air flow may be stopped by turning valve 50 and the mechanism moved to clean another segment of the mold 11, or the mechanism may be moved progressively along the mold surface without stopping the flow of abrasive.

The embodiment shown in Figs. 8, 9 and 10 is also constructed for enclosure of a segment of the mold. A covering member 56 extends from the inner peripheral edge to the outer peripheral edge of a segment of the mold 11 and a wall member 57 is mounted on the covering member 56 and disposed between one radially extending edge of the covering member and the mold surface. The covering member may enclose completely the space overlying the mold surface but it is not essential for good results. An arm 77 is mounted on the covering member 56 and mounted rotatably on an axial standard 58 which is mounted on the mold 11 at the inner periphery. The standard 58 has a mounting flange 73 extending radially to the inner periphery of the mold and mounted on the mold by bolts 74 and nuts 75. The movement of the arm 77 may be restricted by a nut 76 which is threaded on the standard 58. The standard 58 and arm 77 restrict the movement of the covering member to rotation about the mold center and provide for the reduction of leakage at the adjoining edges of the mold and covering member.

Air and abrasives are conducted to the mold by a nozzle 16 connected to a conducting member 53 which receives air from conduit 13 and abrasive from conduit 12, a regulating valve 50 being included. The nozzle is manually directed toward the mold surface of the covered segment through the end opening between the free edge of the cover 56 and the mold surface. An aperture is provided in the wall member 57 to which a suction producing apparatus is connected by a conduit 33 to produce a low-pressure area at the aperture in the wall member 57 for removing the cleaning residue. A handle 59 is mounted on the cover 56 for moving the residue collecting member about the mold 11. Gasket members 55 are mounted on the residue collecting member between the mold 11 and the cover member 56 and between the mold 11 and the wall member 57 to minimize leakage at these points.

In operation of this embodiment, the standard 58 is mounted on the mold 11, the suction producing apparatus is set in operation and the abrasive and air are applied to the mold in the desired quantity by adjustment of the valve 50 and may be directed against the mold surface manually. As the mold is cleaned, the residue collecting member may be moved to cover other portions of the mold by means of the handle 59. This may be a progressive movement, or sectors may be selected as desired.

In Figs. 11 and 12 the invention is motor driven and is applied to a watchcase type mold 60, 61, but may be used on other types also. A residue collecting member which comprises a cover plate 62 is mounted on an annular base plate 63 having flanged edges abutting the mold 61. Gasket sealing members 31 are interposed between the surfaces of the base plate and the outer circumference of the mold 61 for sealing thereof.

At the center of the cover plate an aperture is provided through which a tubular member 64 is inserted and rotatably mounted therein. On the mold side of the cover plate a radially extending hollow arm 65 is mounted on the tubular member 64 and connects the tubular member to a flexible conduit member 66. A suitably shaped nozzle 16 is connected to the flexible conduit member 66 and mounted on adjustable link members 67, which are mounted on the arm 65.

The opening at the center of the mold is covered by a plate 68 which is urged against the mold by a spring 69 interposed between the end of the tubular member 64 and the plate 68. Gasket members 31 are interposed between the plate 68 and the mold to provide a seal therebetween.

On the exposed face of the cover plate 62 a motor unit 38 is mounted, which drives a shaft 63. A bevel gear 71 is mounted on the shaft 63 and meshes with a bevel gear 72 which is mounted on the tubular member 64 for turning the tubular member and appurtenances.

Air and abrasives are conducted to the apparatus by conduits 12 and 13, which are connected to a swivel joint member 70 secured to the tubular member 64 in a manner such that the tubular member may rotate relative to the conduits 12 and 13 without obstructing the passage of air and abrasive from the conduits to the nozzle 16.

The cover plate 62 has openings through which the cleaning operation may be observed. These openings are covered by transparent elements 32 and secured to the plate 62 as by wing nuts. The residue of the cleaning operation is removed by suction through an aperture 40 in the base plate 63 to which suction-producing apparatus is connected by a conduit 33.

In operation the apparatus of Figs. 11 and 12 is mounted on the mold 61 as shown in Fig. 11, and the nozzle 16 is adjusted to a desired position. The suction-producing apparatus is activated and the air and abrasive is supplied through conduits 12 and 13, and directed to the mold surface by the nozzle 16. The nozzle may be moved to other portions of the mold progressively or as desired by means of the motor unit 38, which turns shaft 37 and gear 71 to urge gear 72 to rotate about the tubular member 64 and move arm 65 about the mold 61. The apparatus may be used to clean the upper mold member 60 of the watchcase mold by inverting the apparatus and holding it suspended against the mold member 60 by suitable means such as clamps.

Variations may be made without departing from the scope of the invention as it is defined in the following claims.

We claim:

1. Apparatus for cleaning the face of a tire mold having tread and sidewall forming configurations, said apparatus comprising a curved covering member for enclosing at least a portion of the space overlying the mold face with a marginal portion of said member disposed at a marginal portion of the mold face, a nozzle for directing the flow of mold cleaning substance against relatively small spots of said mold face, said nozzle being in communication with the mold face, said apparatus being arranged to permit swinging movement of the nozzle relative to said covering member and mold face by manipulation of the operator to direct said flow of cleaning substance against selected spots of the mold face within the area enclosed by said covering member, and suction means for withdrawing the cleaning substance from said space in face up as well as in other dispositions of the mold.

2. Apparatus for cleaning the face of a tire mold having tread and sidewall forming configurations, said apparatus comprising a circular covering member mounted with its axis coinciding with the axis of the tire mold for totally enclosing the space overlying the mold face with a marginal portion of said member disposed at a marginal portion of the mold face, a nozzle for directing the flow of a mold cleaning substance against relatively small spots of said mold face, said nozzle being disposed within said covering member, said apparatus being arranged to permit swinging movement of the nozzle with respect to the mold face by manipulation of the operator to direct said flow of cleaning substance against selected spots of the mold face, and suction means for withdrawing the cleaning substance from said space in face up as well as in other dispositions of the mold.

3. Apparatus for cleaning the face of a tire mold having tread and sidewall forming configurations, said apparatus comprising a circular covering member having an axis coinciding with the axis of the tire mold and being mounted on said tire mold in a manner permitting relative rotation coaxially with respect to the tire mold and totally enclosing the space overlying the mold face with a marginal portion of said member disposed at a marginal portion of the mold face, a nozzle for directing the flow of a mold cleaning substance against relatively small spots of said mold face, said nozzle being disposed within said covering member, said apparatus being arranged to permit swinging movement of the nozzle with respect to the mold face by manipulation of the operator to direct said flow of cleaning substance against selected spots of the mold face, and suction means for withdrawing the cleaning substance from said space in face up as well as in other dispositions of the mold.

4. Apparatus for cleaning the face of a tire mold having tread and sidewall forming configurations, said apparatus comprising an inner plate structure with a marginal portion disposed at the inner peripheral margin of the mold face and covering the central region of the mold, a cover plate structure with a marginal portion disposed at the outer peripheral marginal portion of the mold face enclosing the space overlying the mold face and said inner plate structure, a nozzle for directing the flow of mold cleaning substance against relatively small spots of said mold face, said nozzle being in communication with the mold face, said apparatus being arranged to permit swinging movement of the nozzle relative to said cover plate structure by manipulation of the operator to direct said flow of cleaning substance against selected spots of the mold face, and suction means for withdrawing the cleaning substance from said space.

5. Apparatus for cleaning the face of a tire mold having tread and sidewall forming configurations, said apparatus comprising an inner supporting plate structure with a marginal portion disposed at the inner peripheral margin of the mold face and covering the central region of the mold, a post supported by said inner supporting plate structure, a cover plate structure with a marginal portion disposed at the outer marginal portion of the mold face enclosing the space overlying the mold face and said inner supporting plate structure, a nozzle for directing the flow of mold cleaning substance against relatively small spots of said mold face, an arm member extending outwardly from said post and mounted on said cover plate structure in a manner to permit rotation of said arm member relative to said post, said nozzle being mounted on said arm for rotative movement about said post and for swinging movement of the nozzle relative to said cover plate structure to direct said flow of cleaning substance against selected spots of the mold face, and suction means for withdrawing the cleaning substance from said space.

6. Apparatus for cleaning the face of a tire mold having tread and sidewall forming configurations, said apparatus comprising an inner supporting plate structure with a marginal portion disposed at the inner peripheral margin of the mold face and covering the central region of the mold, a post supported by said inner supporting plate structure, a base ring at the outer peripheral margin of the mold face and a cover plate structure seated on and rotatable relative to said base ring for enclosing the space overlying the mold face and said supporting plate structure, a nozzle for directing the flow of mold cleaning substance against relatively small spots of said mold face, an arm member extending outwardly from said post and mounted on said cover plate structure in a manner to permit rotation relative to said post, said nozzle being mounted on said arm for rotative movement about said post and for swinging movement of the nozzle relative to said cover plate structure to direct said flow of cleaning substance against selected spots of the mold face, and suction means for withdrawing the cleaning substance from said space.

7. Apparatus for cleaning the face of a tire mold having tread and sidewall forming configurations, said apparatus comprising a domed covering member comprising a plate of transparent material with a marginal portion disposed at a marginal portion of the mold face for completely enclosing the space overlying a segment of the mold face, a nozzle for directing the flow of mold cleaning substance against relatively small spots of the mold face, said nozzle being mounted at the apex of said domed covering member for swinging movement relative thereto by manipulation of the operator to direct said flow of cleaning substance against selected spots of the segment, and suction means for withdrawing the cleaning substance from said space in face up as well as in other dispositions of the mold.

8. Apparatus for cleaning the face of a tire mold having tread and sidewall forming configurations, said apparatus comprising an inner plate structure with a marginal portion disposed at the inner peripheral margin of the mold face and covering the central portion of the mold, a cover plate structure with a marginal portion disposed at the outer marginal portion of the mold face enclosing the space overlying the mold face and said inner plate structure, a nozzle for directing the flow of mold cleaning substance against relatively small spots of said mold face, an arm member interposed between said plate structures and mounted on said structures at the central portion of the mold for rotation of the arm about the axis of the mold, said nozzle being mounted on said arm for rotative movement with said arm and for swinging movement of the nozzle relative to said mold to direct said flow of cleaning substance against selected spots of the mold face, and suction means for withdrawing the cleaning substance from said space.

NORRIS W. BIGGS.
GEORGE M. HENDERSON.

REFERENCES CITED

The following references are of record in the file of this patent:

UNITED STATES PATENTS

| Number | Name | Date |
| --- | --- | --- |
| 537,160 | King | Apr. 9, 1895 |
| 914,783 | Boland | Mar. 9, 1909 |

FOREIGN PATENTS

| Number | Country | Date |
| --- | --- | --- |
| 108,256 | Australia | Aug. 11, 1939 |
| 332,849 | Great Britain | July 31, 1930 |
| 380,330 | France | Oct. 4, 1907 |